Figure 1:
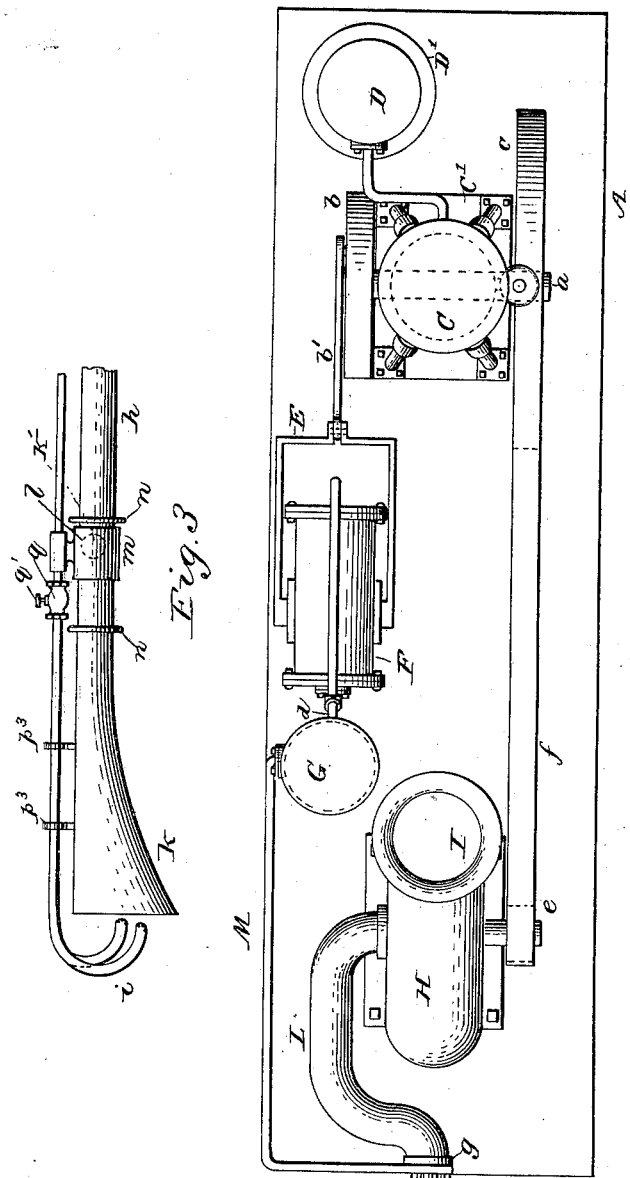

No. 608,689. Patented Aug. 9, 1898.
G. S. LEE.
COTTON HARVESTER.
(Application filed July 30, 1897.)
(No Model.) 2 Sheets—Sheet 1.

Witnesses
B. R. Kelly.
Geo. M. Cofenhaver.

Inventor
George S. Lee
by Connally Bros.
Attorneys

No. 608,689. Patented Aug. 9, 1898.
G. S. LEE.
COTTON HARVESTER.
(Application filed July 30, 1897.)
(No Model.) 2 Sheets—Sheet 2.

Witnesses
B. R. Kelly.
Geo. M. Coffeehaver.

Inventor
George S. Lee
by Connally Bros.
Attorneys

UNITED STATES PATENT OFFICE.

GEORGE S. LEE, OF HAWTHORNE, NEW JERSEY.

COTTON-HARVESTER.

SPECIFICATION forming part of Letters Patent No. 608,689, dated August 9, 1898.

Application filed July 30, 1897. Serial No. 646,485. (No model.)

*To all whom it may concern:*

Be it known that I, GEORGE S. LEE, a citizen of the United States, residing at Hawthorne, in the county of Passaic and State of New Jersey, have invented certain new and useful Improvements in Cotton-Harvesters; and I do hereby declare the following to be a full, clear, and exact description of the invention, such as will enable others skilled in the art to which it appertains to make and use the same.

My invention has relation to cotton-harvesters, and has for its object the provision of means for rapidly and economically removing the ripened cotton from the plant and conveying it to a place of temporary storage without injury to the plants and free from twigs, leaves, and other undesirable material.

I propose to employ as a means for removing the lint from the plant and for conveying it to a temporary place of storage the impact of a blast of compressed air against the lint cotton and independent suction produced by forced draft.

I am aware that it has been proposed to remove the ripened cotton from the bolls of the plant by the action of air-currents, both in the form of blast and suction; but I propose to utilize these combined sources of energy in such manner that the lint cotton will be removed from the plant-boll mainly by the force of intermittent blasts of compressed air under high pressure and conveyed by suction from the point of its removal to a receptacle for temporary storage, and to assist the dislodgment of the cotton from the boll I propose to utilize a manually or automatically operated movable finger which acts in conjunction with the blast of air.

In carrying my invention into effect I arrange upon a suitable vehicle adapted to be drawn or propelled between the rows of plants a suitable source of power, such as a gas or petroleum engine, and from such engine operate a fan or equivalent device for creating suction in suitable flexible tubes and in addition thereto an air-compressor, which compresses air into a storage-reservoir, and I convey the compressed air to the mouths of said flexible tubes, which are adapted to be brought into proximity to the cotton-bolls and are provided with a novel arrangement of valves so constructed and operated that when the mouth of the flexible tube or pipe connected with the suction device is brought into the proper position with relation to the cotton-boll the suction will be diverted from an opening in the side of the pipe or tube to the mouth of the tube and simultaneously a sudden and violent blast of air will be emitted from the pipe conveying air under pressure, and the end of the compressed-air pipe will be moved toward the bell-mouth of the suction-tube, so that the cotton will be wrested from the boll of the plant by the blast and the movement of the compressed-air pipes and conveyed by the suction in the flexible conveying-tube to a proper receptacle, preferably mounted on the vehicle that carries the motor, the suction-fan, and the compressing apparatus.

My invention consists in the novel method of removing cotton from the plant and in the novel apparatus for carrying such method into effect, hereinafter described.

Figure 2:
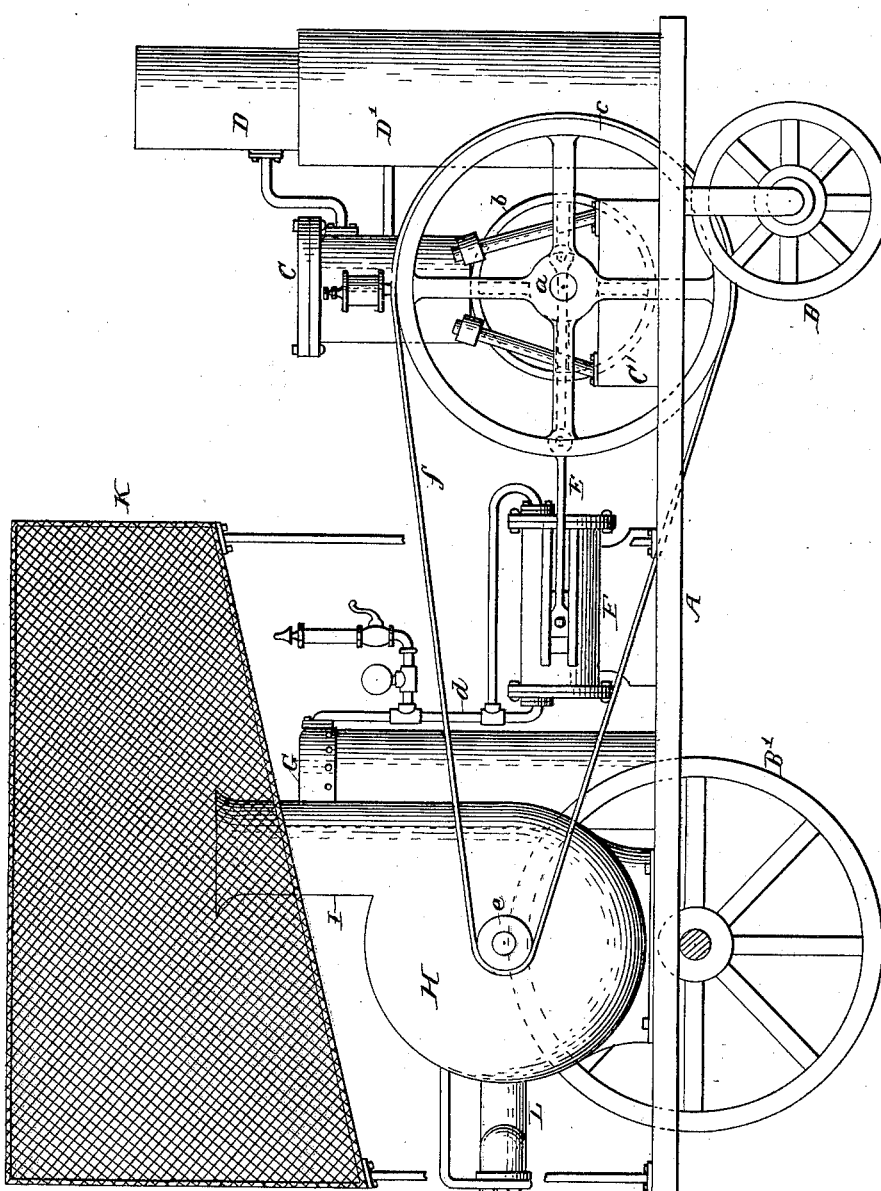

Referring to the accompanying drawings, Figure 1 is a plan view of the apparatus; Fig. 2, a side elevation of the same; and Fig. 3, a fragmentary view, on an enlarged scale, of one of the tubes for conveying the cotton from the plant to the receptacle on the vehicle.

A designates the base or body of the vehicle upon which the working parts are mounted, said body being supported upon wheels B B' at front and rear. At or near the front of the body A is arranged a petroleum-engine comprising the cylinder C, mounted on a base C'. It is provided with the usual valves and other required parts and receives a supply of petroleum from a tank D, that is placed on top of a tank D', which contains a supply of water for cooling the cylinder C. The shaft $a$ of the engine is provided with a fly-wheel $b$ on one side and a belt-pulley $c$ on the other. The fly-wheel $b$ is connected by a pitman $b'$ with the yoke E, which is in turn connected with the piston of the double-action compression-pump F. An air-reservoir G is arranged in convenient relation to the air-compressor and connected thereto by a pipe $d$. A rotary fan H is arranged at or near the rear of the vehicle-body A, and a small pulley $e$ on the shaft of the fan receives motion by the belt $f$ from the pulley $c$ on the shaft of the engine. The fan H is constructed so as to receive air at its center and discharge it at its periphery, and a discharge-tube I projects upwardly from the casing of the fan and into a suitable receptacle K for the cotton. A pipe L leads from the central opening at one side of the fan to the rear of the vehicle and terminates in a head $g$, from which proceed a number of tubes $h$ $h$, which are of sufficient length to easily reach the cotton-bolls on the plants at each side of the vehicle, it being my purpose to move the vehicle along between the rows of plants. A pipe M leads from the air-reservoir to the vicinity of the head $g$ and is provided with branches of flexible tubing equal in number to the branches which proceed from the head $g$. These branch pipes from the air-reservoir are connected to the flexible pipes from the head $g$ and are suitably attached thereto at proper intervals and terminate each in a curved nozzle $i$, which bends around in front and discharges into a bell-mouthed metallic piece $k$, that is secured to the end of each of the tubes $h$ $h$. The bell-mouthed terminal of one of the tubes $h$ is shown in detail in Fig. 3 of the drawings, and consists of a light metallic bell-mouthed body $k$, having at one side and at some distance back from the mouth an opening $k'$, that is covered with wire-gauze or other suitable screening substance which will prevent the entrance into the tubes of leaves or twigs. A sleeve $m$ slides on the part $k$ between collars $n$ $n$, said sleeve being of such length that in one position it covers the opening $l$, while in another position it uncovers the same. The curved nozzle $i$ of the compressed-air pipe is of metal and is arranged to slide in eyes $p^3$ $p^3$ on the bell-mouthed section $k$ and is provided with a spring-closed valve $q$, having a stem $q'$, which is so placed as to be within reach of the thumb of the operator when the sleeve $m$ is grasped in the hand. The sleeve $m$ and the nozzle $i$ are attached and moved together, the movement of the sleeve serving to pull the curved end of the nozzle toward the bell-mouthed end of the suction-tube and at the same time closing the opening in the side of the suction-tube and diverting the current of air produced by the suction from the opening in the side to the bell-mouthed end of the suction-tube.

The operation of the apparatus is as follows: The engine being started communicates motion through the belt to the suction-fan and through the pitman to the air-compressor, and air is sucked in through the flexible tubes $h$ $h$ simultaneously with the storage of compressed air in the air-reservoir. The apparatus being drawn or propelled between the rows of plants, operators following the vehicle each hold in hand one of the flexible tubes $h$ $h$, and when a ripened boll of cotton is reached the bell-mouthed end of the flexible tube is presented to the boll, while the nozzle of the compressed-air pipe is at the opposite side of the boll. The operator then slides along the sleeve on the flexible tube, so as to close the opening in the side of the same, and this motion diverts the direction of the suction-draft from the opening in the side of the tube to the bell-mouth of the same. Simultaneously the nozzle of the air-pipe is brought into contact with the cotton and starts to drag it from the plant and into the bell-mouthed end, and at the same time the valve on the compressed-air pipe is suddenly opened and a strong blast of air from the compressed-air reservoir striking the boll of cotton wrenches it from the plant and blows it into the bell-mouthed end of the suction-pipe, through which it is conveyed, passing through the fan to the receptacle on the vehicle.

Having described my invention, I claim—

1. The method of harvesting cotton consisting in separating the cotton from the plant by intermittent blasts of compressed air and conveying it to a receptacle by suction as set forth.

2. The method of harvesting cotton consisting in separating the cotton from the plant and conveying it to a receptacle by suddenly-applied intermittent blasts of compressed air and a constantly-exerted suctional force, substantially as described.

3. In a cotton-harvester, the combination of a suction-fan, a flexible tube connected directly thereto, a hole in the side of said tube communicating with the open air, a manually-operable valve adapted to close said hole and divert the entire suctional force of the fan to the mouth of the tube when the tube is presented to the cotton, substantially as described.

4. In a cotton-harvester, the combination with a fan, a suction-tube connected therewith, and a valve arranged to close an opening in the side of said tube thereby diverting the suction to the mouth of the tube and connected to a movable part adapted to embrace the cotton and draw it toward the mouth of the suction-tube when said valve is operated to close the opening in the side of the tube, substantially as described.

5. In a cotton-harvester, the combination of a motor or engine, a fan connected to and operated thereby and suction-tubes connected to said fan, of an air-compressor, a reservoir for compressed air and pipes connected to said reservoir, leading to the mouths of said suction-tubes and extending beyond the same a sufficient distance to admit of the introduction of the cotton in the boll between the discharge ends of the air-tubes and the mouths of the suction-tubes, and discharging thereinto, substantially as described.

6. In a cotton-harvester, the combination of a motor, a fan, suction-tubes connected to said fan, an air-compressor, a reservoir for compressed air, pipes leading from said reservoir to the mouths of said suction-tubes with movable nozzles on said compressed-air pipes discharging into said suction-tubes and adapted to force the cotton toward the tubes and valves on said air-pipes whereby a blast of compressed air may be discharged into the suction-tubes simultaneously with the movement of the nozzles, substantially as described.

In testimony whereof I have affixed my signature in presence of two witnesses.

GEORGE S. LEE.

Witnesses:
JOSEPH B. CONNOLLY,
ANTHONY A. CONNOLLY.